UNITED STATES PATENT OFFICE.

CLINTON E. DOLBEAR, OF SAN FRANCISCO, CALIFORNIA, ASSIGNOR TO INDUSTRIAL RESEARCH CO., OF SAN FRANCISCO, CALIFORNIA, A BUSINESS ASSOCIATION.

SEPARATION OF BORAX FROM POTASSIUM SALTS.

1,382,825.  Specification of Letters Patent.  Patented June 28, 1921.

No Drawing.  Application filed October 26, 1920.  Serial No. 419,751.

*To all whom it may concern:*

Be it known that I, CLINTON E. DOLBEAR, a citizen of the United States, residing at the city and county of San Francisco and State of California, have invented certain new and useful Improvements in the Separation of Borax from Potassium Salts, of which the following is a specification.

My invention relates to and has for its object the separation of borax and other deleterious substances from potassium salts recovered from potassium and borax-bearing brines, such, for example, as those found at Searles Lake, California.

I have discovered that if the salts deposited upon the concentration and cooling of such a brine are drained of the excess of mother liquor and then heated, the retained moisture together with the water of crystallization of the contained borax, will cause the borax to be redissolved. Then if the hot wet mixture of liquor and potassium salt is subjected to spinning in a centrifuge, the liquor containing the borax in solution will be effectually separated from the potassium salt; and if, while being whirled in the centrifuge, the potassium salt is sprayed with a small amount of hot water, the borax content will be reduced to a mere trace, too small to be harmful. Carbonate and sulfate of soda, if present, are also eliminated from the potassium salt, in the same manner and at the same time.

By this procedure, potassium salt from Searles Lake brine can be directly crystallized from the hot concentrated brine, the crystallized mass drained of excess of mother liquor, heated and then spun in a centrifuge, and washed with a hot water-spray.

The potassium salt remaining in the centrifuge is naturally of higher grade than before being spun, and contains sodium chlorid only, in appreciable quantity as an impurity. The liquor thus separated from the potassium salts contains practically all the borax in concentrated condition.

If this hot liquor is then diluted to a point where it will not crystallize until it has cooled to a transition point at or below 63 degrees C., it will when cooled to crystallization yield borax in very pure condition, while any potassium salt present will remain dissolved in the mother liquor. This mother liquor can then be separated from the borax crystals and returned to the evaporator for further concentration, to recover the contained potassium salts and borax.

I claim:—

1. The process of separating borax from mixtures of potassium salts and borax, which consists in heating the mixture in moist condition; and separating the resultant liquor with its dissolved content, from the undissolved salts.

2. The process of separating borax from mixtures of potassium salts and borax, which consists in heating the mixture in moist condition; and separating the resultant liquor with its dissolved content, from the undissolved salts, by subjecting the mixture to centrifugal action.

3. The process of separating borax from mixtures of potassium salts and borax, which consists in heating the mixture in moist condition until the borax is dissolved in the resultant liquor; and then separating said liquor with its borax content from the undissolved potassium salts.

4. The process of separating borax from mixtures of potassium salts and borax, which consists in heating the mixture in moist condition until the borax is dissolved in the resultant liquor; and then subjecting said mixture to centrifugal action to separate the liquor with its borax content, from the undissolved salts.

5. The process of separating borax from mixtures of potassium salts and borax, which consists in heating the mixture in moist condition until the borax is dissolved in the resultant liquor; separating the liquor with its borax content from the undissolved potassium salts; and washing said salts with a spray of hot water.

6. The process of separating borax from mixtures of potassium salts and borax, which consists in heating the mixture in moist condition until the borax is dissolved in the resultant liquor; subjecting the mixture to centrifugal action to separate the liquor with its borax content, from the undissolved potassium salts; and washing said salts during centrifuging with a spray of hot water.

7. The process of treating potassium and borax bearing brines, which consists in concentrating and cooling the brine to deposit salt mixtures; draining the deposited salt mixtures of an excess of mother liquor; heating the moist mixture until the borax is redissolved in the resultant liquor; and separating the said liquor with its borax content from the undissolved potassium salts.

8. The process of treating potassium and borax bearing brines, which consists in concentrating and cooling the brine to deposit salt mixtures; draining the deposited salt mixtures of an excess of mother liquor; heating the moist mixture until the borax is redissolved in the resultant liquor; separating the said liquor with its borax content from the undissolved potassium salts and washing said salts with a spray of hot water.

9. The process of treating potassium and borax bearing brines, which consists in concentrating and cooling the brine to deposit salt mixtures; draining the deposited salt mixtures of an excess of mother liquor; heating the moist mixture until the borax is redissolved in the resultant liquor; and separating the said liquor with its borax content from the undissolved potassium salts by subjecting the mixture to centrifugal action.

10. The process of treating potassium and borax bearing brines, which consists in concentrating and cooling the brine to deposit salt mixtures; draining the deposited salt mixtures of an excess of mother liquor; heating the moist mixture until the borax is redissolved in the resultant liquor; separating the said liquor with its borax content from the undissolved potassium salts, by subjecting the mixture to centrifugal action; and washing said salts during centrifuging with a spray of hot water.

In testimony whereof I have signed my name to this specification.

CLINTON E. DOLBEAR.